UNITED STATES PATENT OFFICE.

J. L. G. WARD, OF ADRIAN, MICHIGAN.

IMPROVEMENT IN ARTIFICIAL STONE.

Specification forming part of Letters Patent No. 24,769, dated July 12, 1859.

*To all whom it may concern:*

Be it known that I, J. L. G. WARD, of Adrian, in the county of Lenawee and State of Michigan, have invented a new and useful Composition Constituting an Artificial Stone; and I do hereby declare that the following is a full, clear, and exact description of the component parts of and method of compounding and using the same.

To make the composition, take six (6) measures of a solution of silicate of soda made by dissolving two (2) pounds of silicate of soda in one (1) gallon of boiling water. Add five (5) similar measures of pulverized fluor-spar, and stir till well mixed. Then add five (5) similar measures of pulverized pumice-stone and ten (10) similar measures of Roman cement, and stir the whole together till well mixed, when the composition is ready for use, either to be applied as a protection to roofs or other portions of the exteriors or interiors of buildings against the weather, or against fire, or to be molded or cast into suitable forms for architectural ornaments, or for taking casts of sculpture, and generally as a substitute for stone.

To apply the composition as a protection to roofs or other portions, it is spread over the surface by means of a trowel or other suitable instrument. In taking casts of sculpture or for architectural ornaments it is used in the same manner as other plastic materials employed for the same purpose.

This composition hardens quickly by exposure to the atmosphere, the Roman cement serving as a kind of sponge until the silica shall have become hard by the absorption of carbon from the atmosphere, and when hard the composition has the most indestructible character, resisting effectually the action of the several tests of weather, and being only with great difficulty injured by the action of instruments of metal.

Having described my invention, I claim as new and desire to secure by Letters Patent—

As an improved article of manufacture, a cement composed of pumice-stone, silicate of soda, fluor-spar, and Roman cement, as herein set forth.

J. L. G. WARD.

Witnesses:
R. B. ROBBINS,
W. H. WARD.